United States Patent [19]

Campbell et al.

[11] 4,384,108

[45] May 17, 1983

[54] TWO-PHASE INTERFACIAL POLYCARBONATE PROCESS

[75] Inventors: John R. Campbell, Saratoga; Jerry C. Lynch, Schenectady, both of N.Y.

[73] Assignee: General Electric Company, Schenectady, N.Y.

[21] Appl. No.: 276,329

[22] Filed: Jun. 22, 1981

[51] Int. Cl.³ .............................................. C08G 63/62
[52] U.S. Cl. .................... 528/196; 528/198; 528/199; 528/204
[58] Field of Search ............... 528/196, 198, 199, 204

[56] References Cited

U.S. PATENT DOCUMENTS

| | | | |
|---|---|---|---|
| 2,970,131 | 1/1961 | Moyer et al. | 528/196 |
| 3,028,365 | 4/1962 | Schnell et al. | 528/196 |
| 3,173,891 | 3/1965 | Fry et al. | 528/196 |
| 3,275,601 | 9/1966 | Schnell et al. | 528/198 |
| 3,318,845 | 5/1967 | Dietrich et al. | 528/196 |
| 3,989,672 | 11/1976 | Vestergaard | 528/196 |

*Primary Examiner*—Harold D. Anderson
*Attorney, Agent, or Firm*—Richard J. Traverso; James C. Davis, Jr.; James Magee, Jr.

[57] ABSTRACT

An improved interfacial polycondensation polycarbonate process, the improvement comprising an initial equilibrated pH range of 11 to 13, a temperature range of 15° to 40° C., a carbonyl halide rate of addition of 0.03 to 0.3 moles per minute per mole of aromatic dihydroxy compound, and a chain stopper content of 0.02 to 0.05 moles per mole of aromatic dihydroxy compound. The resulting aromatic polycarbonate exhibits improved chemical and physical properties having a weight average molecular weight within a range of from about 25,000 to 65,000, and a monocarbonate content of less than about 400 parts per million.

14 Claims, No Drawings

TWO-PHASE INTERFACIAL POLYCARBONATE PROCESS

BACKGROUND OF THE INVENTION

1. Field of the Invention

This invention relates to an improved polycondensation process, the improvement comprising a process sequence wherein a two-phase admixture comprising (a) an organic phase containing an aromatic dihydroxy compound, an inert solvent, a polycondensation catalyst, and a chain stopper, and (b) an aqueous phase containing a solution of an alkali metal hydroxide is equilibrated and maintained at a specific pH range prior to the introduction of a carbonyl halide, the improvement comprising adding and reacting the carbonyl halide in the two-phase organic aqueous phase admixture in accordance with the following improved process parameters:

(1) a pH range of 11 to 13,
(2) a reaction temperature range of from 15° to 40° C.,
(3) a carbonyl halide rate of addition of 0.03 to 0.3 moles/minute per mole of aromatic dihydroxy compound, and
(4) a chain-stopper content of 0.02 to 0.05 moles per mole of aromatic dihydroxy compound.

The resulting aromatic polycarbonates exhibit improved chemical and physical properties including a novel combination of a weight average molecular weight ($\overline{Mw}$) range of from about 25,000 to 65,000 and a monocarbonate content of less than about 400 parts per million.

2. Description of the Prior Art

In general, interfacial polycondensation publications including "The Encyclopedia of Polymer Science," Vol. 10 (1969), "Chemistry and Physics of Polycarbonates, Polymer Reviews", H. Schnell, Vol. 9, John Wiley & Sons, Inc. (1964); "Polycarbonates", Christopher N. Fox, Rheinhold Corporation of New York, (1962); among other publications, including U.S. patents, e.g., U.S. Pat. Nos. 2,970,131; 3,028,365; 3,173,891; 3,275,601; 3,318,845,; and 3,989,672, report generally effective interfacial polycondensation processes.

Moyer, Jr. et al. in U.S. Pat. No. 2,970,131 describes a 2-step interfacial polycondensation polycarbonate process where the first step is carried out at a controlled pH range of 10.5–11.55, at a controlled temperature of 20°–30° C. to form an intermediate polymer which is subsequently bodied (equilibrated to a high molecular weight polycarbonate in the presence of a phase transfer agent (e.g. a quarternary ammonium compound) again under controlled reaction temperatures of 20°–30° C. Moyer states that the nature of the polycarbonate formed is independent of the length of time permitted for phosgenation so long as the pH of the reaction system is maintained within limits of 10.5 to 11.55. Moyer, Jr's Examples describe phosgenation reactions carried out over time periods of from 1 hour–45 minutes (minimum) to 10 hours–55 minutes (maximum). Moyer, Jr. et al. further describes that large excesses of sodium hydroxide lead to several side reactions contributing to decreased process efficiency and inferior final polymer product. Moyer also states that when chain-stoppers, e.g. para-phenylphenol, are used to control molecular weight, polymers having narrow limits are found which are of particular interest.

Fry et al. U.S. Pat. No. 3,173,891 describes a 2-step interfacial poly-condensation polycarbonate process which overcomes some of the defficiencies associated with the Moyer, Jr. et al. U.S. Pat. No. 2,970,131 by conducting the polycondensation reaction at a pH range of 10.5–11.8, preferably from 10.8–11.3, at a temperature of 20°–30° C., in the presence of a tertiary amine and para-phenylphenol. Fry states that the amine and p-phenylphenol combination functions as a unique bodying catalyst and chain growth terminator, a combination which cooperates to produce polycarbonates having the same desired molecular weight from batch to batch, even though reaction variables such as temperature and length of phosgenation vary widely.

Fry et al. like Moyer, Jr. et al. describes the 2-step process as contributing to a substantially lessened extent of side reaction occurrence so that greater latitude is possible with respect to such variables as phosgene addition rate, total phosgene addition time, reaction temperature, and time lapse between phosgene addition and subsequent isolation and purification of the final polycarbonate product. Like Moyer, Jr., Fry's rate of phosgenation is slow and is carried out over a 1 hour and 45 minutes time period.

Vestergaard, U.S. Pat. No. 3,989,672 describes an interfacial polycondensation polycarbonate process which cited both the Fry et al. and Moyer et al. patents as prior art. Vestergaard stated that molecular weight and the polydispersivity index were beneficially controlled by maintaining a reaction environment pH range of 8.0 to 10.2 during the polycondensation process.

Unexpectedly, the interfacial polycondensation process of this invention provides novel aromatic polycarbonates having a $\overline{M}_w$ range of about 25,000–65,000 and a monocarbonate content of less than about 400 parts per million, subject to the proviso that the aromatic polycarbonates are prepared by an interfacial polycondensation polycarbonate process where the pH range is critically controlled and is initially and continuously throughout the polycondensation process maintained within the range of from at least 11 to about 13 prior to addition of any carbonyl halide, where the reaction environment is maintained at a temperature range of from 15° C. to 40° C., where the carbonyl halide is introduced at an average rate of about 0.03 to 0.3 moles/minute of carbonyl halide per mole of aromatic dihydroxy compound, and where a chain-stopper is present in amounts of 0.02 to 0.05 moles per mole of aromatic dihydroxy compound.

The process of this invention is unobvious since the process is generally carried out at phosgenation rates which are 3 to 300 times more rapid than those described in the Moyer, Jr. et al., Fry et al. or Vestergaard and is not limited to the use of any particular chain stopper or catalyst combination.

DESCRIPTION OF THE INVENTION

This invention embodies an improved interfacial polycondensation process for the preparation of an aromatic polycarbonate by reacting at least one dihydric phenol with at least one carbonyl halide in the presence of a polycondensation catalyst and a chain stopper the improvement comprising an initial equilibration pH range of 11 to 13, a temperature range of 15° to 40° C., a carbonyl halide rate of addition of 0.03 to 0.3 moles per minute per mole of aromatic dihydroxy compound, and a chain stopper content of 0.02 to 0.05 moles per mole of aromatic dihydroxy compound.

The polycarbonates prepared by the process of this invention are non-sterically-hindered aromatic polycarbonates (NSH-aromatic-"PC"). These NSH-aromatic-PC's as described herein and in the claims include polycarbonates containing a major portion i.e., more than 80, and frequently 90–100 mol percent of NSH-polycarbonate moieties derived from non-sterically-hindered dihydroxy aromatic compounds and a minor portion, i.e., less than 20, and frequently 0–10 mol percent of sterically-hindered (SH—) polycarbonate moieties derived from SH-dihydroxy aromatic compounds. The expression non-sterically-hindered dihydric or dihydroxy aromatic compounds or non-sterically-hindered phenols as employed herein and in the claims includes any dihydric phenol free of steric hinderance, i.e., dihydric phenols having neither hydroxy group sterically hindered by the presence of a halogen, hydrocarbon or hydrocarbonoxy group ortho-positioned relative to the hydroxy groups of a dihydric phenol. Sterically hindered is defined herein as the presence of a halogen, hydrocarbon or hydrocarbonoxy group directly bonded to each carbon atom ortho-positioned (adjacent to) the carbon atoms directly bonded to hydroxyl groups of the dihydric phenol. These NSH-dihydric phenols are well known to those skilled in the art as illustrated by D. W. Fox's U.S. Pat. No. 3,153,008 and can be illustrated by formula (I) set out hereafter:

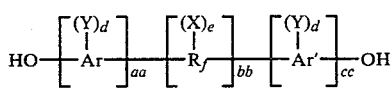
(I)

where $R_f$ is an alkylene, alkylidene including "vinylidene", cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is bromine, chlorine or a monovalent alkyl or alkoxy group, each d represents a whole number up to a maximum equivalent to the number of replaceable hydrogens substituted on the aromatic rings comprising Ar or Ar'—subject to the proviso that when d is equal to two or more, no more than one Y group is ortho-positioned relative to an —OH group, X is bromine, chlorine or a monovalent hydrocarbon group selected from the class consisting of alkyl, aryl and cycloalkyl including mixtures thereof, e represents a whole number of from 0 to a maximum controlled by the number of replaceable hydrogens on $R_f$, aa, bb and cc represent whole numbers including 0, when bb is not zero, neither aa or cc may be zero, otherwise either aa or cc but not both may be 0, when bb is zero, the aromatic groups can be joined by a direct carbon bond.

Included in the NSH-dihydric phenols of formula (I) are, for example, the following:
resorcinol;
4,4'-dihydroxy-diphenyl;
1,6-dihydroxy-naphthalene;
2,6-dihydroxy-naphthalene;
4,4'-dihydroxy-diphenyl methane;
4,4'-dihydroxy-diphenyl-1,1-ethane;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3,3'-dimethyl-diphenyl-2,2-propane;
4,4'-dihydroxy-3,3'-dichloro-diphenyl-2-2-propane;
4,4-dihydroxy-diphenyl-2,2-butane;
4,4'-dihydroxy-diphenyl-2,2-pentane;
4,4'-dihydroxy-diphenyl-2,2-(4-methylpentane);
4,4'-dihydroxy-diphenyl-2,2-n-hexane;
4,4'-dihydroxy-diphenyl-2,2-nonane;
4,4'-dihydroxy-diphenyl-4,4-heptane;
4,4'-dihydroxy-diphenyl phenylmethyl methane;
4,4'-dihydroxy-diphenyl-4-chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-2-naphthylmethyl methane;
4,4'-dihydroxy-tetraphenyl methane;
4,4'-dihydroxy-diphenyl-1,2-ethane;
4,4'-dihydroxy-diphenyl-1,10-n-decane;
4,4'-dihydroxy-diphenyl-1,6(1,6-dioxo-n-hexane);
4,4'-dihydroxy-diphenyl-1,10(1,10-dioxo-n-decane);
bis-p-hydroxy-phenylether-4,4'-biphenyl;
a,a,a'a'-tetramethyl-a,a'-(di-p-hydroxyphenyl)-p-xylylene;
a,a,a',a'-tetramethyl-a,a'-(di-p-hydroxyphenyl)-m-xylylene;
4,4'-dihydroxy-3,3'-dimethyl-diphenyl methane;
4,4'-dihydroxy-2,2'-dimethyl-diphenyl methane;
4,4'-dihydroxy-3,3'-dichloro-diphenyl methane;
4,4'-dihydroxy-3,3'-dimethoxy-diphenyl methane;
4,4'-dihydroxy-2,2',5,5'-tetramethyl-diphenyl methane;
4,4'-dihydroxy-2,2'-dimethyl-5,5'-diisopropyldiphenyl methane;
4,4'-dihydroxy-2,2'-dimethyl-5,5'-dipropyl-diphenyl methane;
4,4'-dihydroxy-diphenyl-5,5-nonane;
4,4,'-dihydroxy-diphenyl-6,6-undecane;
4,4'-dihydroxy-diphenyl-3,3-butanone-2;
4,4'-dihydroxy-diphenyl-4,4-hexanone-3;
4,4'-dihydroxy-diphenylmethyl-4-methoxyphenyl methane;
4,4'-dihydroxy-diphenyl ether;
4,4'-dihydroxy-diphenyl sulfide;
4,4'-dihydroxy-3,3'-dimethyldiphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;
2,2'-bis(4-hydroxy-phenyl)-1-chloroethylene;
2,2'-bis(4-hydroxy-phenyl)-1,1-dichloroethylene; and
2,2'-bis(4-hydroxy-phenyl)-1,1-dibromoethylene, etc.

SH-dihydroxy aromatic compounds that are optionally employed in the practice of this invention are described in detail in U.S. application Ser. No. 254,814 of John R. Campbell. Some specific examples of some SH-bisphenols (hereinafter also referred to as "SH—dihydric phenols" or as "SH-dihydroxy aromatic compounds") follows:
1,1-bis(4-hydroxy-3,5-dimethylphenyl) methane;
2,4'-dihydroxy-3,3',5,5'-tetramethyldiphenyl methane;
1,1-bis(3,5-diethyl-4-hydroxyphenyl) methane;
1,1-bis(3,5-diisopropyl-4-hydroxyphenyl) methane;
1,1-bis(3,5-dibromo-4-hydroxyphenyl) methane;

1,1-bis(3,5-dimethyl-4-hydroxyphenyl) ethane;
1,1-bis(3-methyl-5-ethyl-4-hydroxyphenyl) ethane;
1,1-bis(3,5-diethyl-4-hydroxyphenyl) ethane;
2,2-bis(3-methyl-5-ethyl-4-hydroxyphenyl) propane;
2,2-bis(3,5-dibromo-4-hydroxyphenyl) propane;
2,2-bis(3,5-diisopropyl-4-hydroxyphenyl) propane;
2,2-bis(4-hydroxy-3,5-dimethylphenyl) propane;
2,2-bis(3,5-dibromo-4-hydroxyphenyl) butane;
2,4'-dihydroxy-3,3',5,'5'-tetramethylbenzophenone;
4,4'-dihydroxy-3,3',5,5'-tetraethyldiphenyl sulfone;
4,4'-dihydroxy-3,3',5,5'-tetrabutyldiphenyl sulfide;
4,4'-dihydroxy-3,3',5,5'-tetramethyldiphenyl ether;
4,4'-dihydroxy-3,3',5,5'-tetrapropyldiphenyl sulfoxide;
2,2'-bis(3,5-dimethyl-4-hydroxyphenyl)-1-chloroethylene;
2,2'-bis(3,5-dimethyl-4-hydroxyphenyl)-1,1-dichloroethylene; and
2,2'-bis(3,5-dibutoxy-4-hydroxyphenyl)-1,1-dibromoethylene, etc.

The expression "carbonyl halides" as employed herein and in the claims includes carbonyl dichloride—more commonly known as phosgene, carbonyl dibromide, carbonyl diiodide, carbonyl difluoride, carbonylchlorofluoride, including mixtures thereof.

The non-sterically-hindered aromatic polycarbonates prepared by the process of this invention may be illustrated by formula (II) set out hereafter:

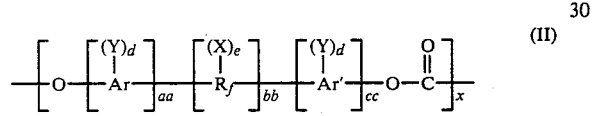

(II)

wherein $R_f$, Ar, Ar', Y, d, X, e, aa, bb, and cc are as defined above and x is a number of at least 25 preferably from 30 to 80 or higher, and often more preferably from 40 to 65.

Presently preferred non-sterically-hindered aromatic polycarbonate segments are illustrated by the formulas:

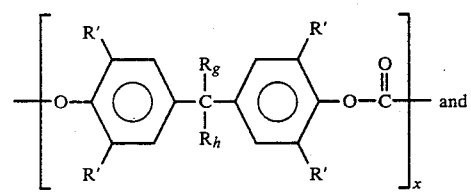

III

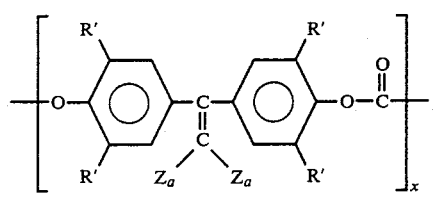

IV where independently each R' is hydrogen, bromine, chlorine or a $C_{1-4}$ alkyl or alkoxy group, $R_g$ and $R_h$ are hydrogen or a $C_{1-2}$ alkyl group, each $Z_a$ is hydrogen, chlorine or bromine, subject to the proviso that at least one $Z_a$ is chlorine or bromine, and x is as previously defined.

The process of preparing the non-sterically-hindered aromatic polycarbonates requires the combination of reactants in accordance with the following general process parameters:

(1) forming an equilibrated substantially uniform agitated two-phase admixture comprising:
 (i) an organic phase containing a non-sterically-hindered aromatic dihydroxy compound, an inert solvent, a polycondensation catalyst, a chain-stopper, and optionally, a sterically-hindered aromatic dihydroxy compound,
 (ii) an aqueous phase containing a solution of an alkali metal hydroxide having a pH within the range of from 11 to 13,
 (iii) adding and reacting a carbonyl halide with the non-sterically-hindered aromatic dihydroxy compound plus any optional sterically-hindered aromatic dihydroxy compound at
  (a) a pH range of 11 to 13,
  (b) a reaction temperature range of from 15° to 40° C.,
  (c) a carbonylhalide rate of addition of 0.03 to 0.3 moles per minute per mole of aromatic dihydroxy compound, and
  (d) a chain-stopper content of 0.02 to 0.05 moles per mole of aromatic dihydroxy compound, to form a non-sterically-hindered aromatic polycarbonate having an $\overline{M}w$ within the range of from 25,000 to 65,000 and a monocarbonate by-product content of less than about 400 parts per million, and
 (iv) recovering the non-sterically-hindered aromatic polycarbonate.

The process parameter related to pH is established prior to the introduction of a carbonyl halide by combining the organic phase and the aqueous phase containing sufficient quantities of alkali metal hydroxide to establish under equilibration conditions of a pH of at least 11 and less than 13. In general, establishing the pH range described above requires a strong alkali metal base, such as sodium hydroxide used in amounts of from 0.25 to 1.4 moles of sodium hydroxide per mol of dihydric phenol reactant employed in the process.

The pH of the reaction is maintained at 11 to 13 after introduction of the carbonyl halide by the addition of alkali metal hydroxide during the course of the reaction, e.g., concurrently, if desired with the carbonyl halide introduction.

Any inert solvent can be used including medium polar solvents such as chlorobenzene, bromobenzene, orthodichlorobenzene, methylene chloride, 1,2-dichloroethane, etc. and mixtures thereof. Preferably, the solvents employed are halogenated hydrocarbons, more preferably methylene chloride.

The interfacial polycondensation is carried out as stated hereinbefore in any strongly basic reaction medium, i.e., having a preformed equilibrated substantially uniform agitated two-phase reactant composite exclusive of carbonyl halide having a pH value of at least 11 or higher. Representative of basic species which can be employed are the following: basic quaternary ammonium, quaternary phosphonium or tertiary sulfonium hydroxide; alkali metal hydroxides; etc. Specific examples are tetramethyl ammonium hydroxide, tetraethyl phosphonium hydroxide, etc.; the lithium, sodium and potassium hydroxides; etc. Especially preferred are sodium or potassium hydroxide.

Any amount of functionally reactive non-sterically-hindered dihydric aromatic compound and carbonyl halide can be employed, subject to the proviso that the carbonyl halide is present in stoichiometric amounts at least sufficient to react with the hydroxy groups associated with the non-sterically-hindered dihydroxy compound. Preferably, the carbonyl halide is present in excess, i.e., in amounts of at least about 1.25 to 1.5 times the stoichiometric amounts required to completely couple all of the reactive aromatic dihydroxy compounds to form the desired aromatic polycarbonates.

Any amount of base can be employed subject to the proviso that the equilibrated agitated two-phase mixture is maintained initially at a pH value of at least about 11, preferably within the range of from 11 to 13, and more preferably from 11.3 to 12.5. Generally effective mol proportions of base relative to the hydroxyl groups associated with the aromatic dihydroxy compounds are within the range of from about 2:1 to 5:1, and frequently preferably from about 2.1:1 to 2.5:1.

The catalyst employed can be any commonly employed in the preparation of aromatic polycarbonates known to those skilled in the art. Illustrative of tertiary amines that can be employed are the following: trimethylamine, triethylamine, allyldiethylamine benzyldimethylamine, dioctylbenzylamine, dimethylphenethylamine, 1-dimethylamino-2-phenylpropane, N,N,N',N'-tetramethylethylenediamine, N-methylpiperidine, 2,2,6,6,-N-pentamethylpiperidine, etc. Presently preferred amine catalysts of this class are aliphatic amines especially triethylamine.

A preferred embodiment optional to the practice of this invention includes the use of quaternary phosphonium amino halide catalysts which are described herein in the claims.

The expression "quaternary-phosphonium amino halide" as employed herein and in the claims (hereinafter also referred to as "aminoalkyl tri-substituted phosphonium compounds") includes, among others, any quaternary phosphonium compound having the structural formula:

(V)

wherein independently each R is an alkyl, cycloalkyl or aryl group, $R_a$ is a divalent alkylene including cycloalkylene group, X is a halogen and independently each $R_b$ and $R_c$ is an alkyl or cycloalkyl group.

Presently preferred "quaternary-phosphonium amino halides" comprise compounds which contain R, $R_a$, $R_b$ and $R_c$ moities belonging to the following classes:
 (a) R is a $C_{1-10}$ alkyl, $C_{4-10}$ cycloalkyl, or $C_{6-10}$ aryl group, including mixtures thereof.
 (b) $R_a$ is a $C_{3-12}$ alkylene or $C_{4-12}$ cycloalkylene group, including mixtures thereof,
 (c) $R_b$ is a $C_{1-10}$ alkyl or $C_{4-10}$ cycloalkyl group, including mixtures thereof, and
 (d) $R_c$ is a $C_{1-10}$ alkyl or $C_{4-10}$ cycloalkyl group, including mixtures thereof.

Included in the quaternary-phosphonium amino halide salts of formula V are, for example, the following:
(3-dimethylaminopropyl)triphenulphosphonium bromide hydrobromide,
(3-diethylaminopropyl)triphenylphosphonium bromide hydrobromide,
(4-didecylaminocyclohexyl)tributylphosphonium chloride hydrochloride,
(5-dioctylaminophenyl)diphenylbutylphosphonium chloride hydrochloride,
(10-dimethylaminodecyl)phenyldibutylphosphonium bromide hydrobromide,
(3-methylethylaminopropyl)tributylphosphonium bromide hydrobromide,
(4-methylbutylaminobutyl)tributylphosphonium bromide hydrobromide, and
(7-cyclohexylpropylaminoheptyl)triphenylphosphonium iodide hydroiodide, etc.

The quaternary-phosphonium amino halides—hereafter for brevity also referred to as (q-PAH) can be prepared by any method well known to those skilled in the art including the methods referenced in Great Britian No. 1,085,406. In general a presently preferred method comprises the reaction of an α,ω-dihaloalkane with a tri-substituted phosphine to form a tetra-substituted phosphonium halide, which is subsequently reacted with an aliphatic secondary amine to form the desired catalyst species, i.e., an (ω-dialkylaminoalkyl) tri-substituted phosphonium compound.

The chain stopper can be any known to those skilled in the art. Illustrative monophenols follow: hydroxybenzene, also known as phenol, para-cyclohexylphenol, para-tertiarybutylphenol, para-bromophenol, etc. Expecially preferred is phenol i.e., hydroxybenzene.

Optionally, however, not essential to the process of this invention, a phase transfer agent can be employed to enhance the process reaction rate. Preferably, the phase transfer agent is selected from the group consisting of quaternary ammonium, quaternary phosphonium, and tertiary sulfonium compounds or mixtures thereof. These phase transfer agents are well known and include illustratively "Onium compounds" described by C. M. Starks, in J.A.C.S. 93, 195 (1971). Specific illustrative examples are described in U.S. Pat. No. 4,201,721 whose descriptions are incorporated herein in their entirety by reference.

Any amount of catalyst can be employed, however, generally effective mol proportions of amine catalyst relative to dihydroxy aromatic compounds are within the range of from about 0.001:1 to about 0.025:1 and more frequently, preferably within the range of from about 0.005:1 to about 0.015:1. Wherein the catalyst is a quaternary phosphonium amine halide generally effective mol proportions of catalyst relative to the dihydroxy aromatic compound are within the range of from about 0.00025:1 to about 0.0025:1, and more frequently, preferably are within the range of from about 0.0005:1 to about 0.001:1 per mol of nonsterically-hindered dihydroxy aromatic compound.

The reactions are carried out at temperatures within the range from about 15° C. to 40° C., and more preferably from about 20° C. to about 35° C.

The best mode of practicing this invention is set out in the following Example.

EXAMPLE 1

Preparation of Bisphenol-A Polycarbonate

A polymerization reactor was charged with 4.3 liters of water, 6.0 liters of methylene chloride, 2280 g. of bis(4-hydroxyphenol)propane-2,2 i.e., bisphenol-A also referred to herein as "BPA", 35 ml. of phenol also known as "hydroxy benzene", 10 g. of triethylamine, 3.4 g. of sodium gluconate, and 415 ml. of a 35% (w/w) of an aqueous sodium hydroxide solution. The admixture was equilibrated to form a substantially uniform agitated two-phase admixture by stirring for approximately 5 minutes while a pH of approximately 11.3 to 11.7 was attained. Phosgene was introduced from a calibrated flow meter at 63 g. per minute. By means of an automatic pH control a caustic 35% w/w aqueous sodium hydroxide solution was intermittently added to the reactor at a rate of 170 to 190 ml. per minute to maintain the reaction pH within the abovenoted pH range during the course of the reaction. After approximately 20–22 minutes phosgene flow was stopped, and the polymer reaction mixture was continuously agitated for an additional 2 minutes. The aqueous layer was sampled to determine residual "BPA" monomer which for control purposes was required to be less than 15 parts per million. The organic phase was separated and diluted with 4000 ml. of methylene chloride, washed twice with a dilute hydrochloric acid, (4000 ml. of a 2% w/v solution), and twice with 4000 ml. of deionized water. The resulting polymer solution was flash evaporated with steam and the resulting precipitate was collected and dried in nitrogen.

The resulting polycarbonate was characterized by gel permeation chromatography based on a polystyrene calibration which is described in greater detail hereafter. The polymer had an intrinsic viscosity [$\eta$] of 0.518 dl/g. measured in chloroform at 25° C. The GPC analysis was performed at a flow rate of 2.0 ml. per minute chloroform using a series $10^5$, $10^4$, $10^3$ and 500 (A) microstyrogel column calibrated against polystyrene standards. Melt Index is reported in terms of zero shear (0.025 $sec^{-1}$) melt viscosity values equivalent to mechanical spectrometry measurements at 300° C. corrolated with General Electric's proprietary laboratory control Melt Index values reported in K.I. index terms. The percent change in Melt Index is the ratio of the melt index after 6 minute heat aging at 300° C. divided by the melt index after 12 minutes heat aging at 300° C. times 100. Stabilized samples were also evaluated for change in melt index reported again as the percent change over the 6–12 minute heat age time periods. Color measurements of the degree of yellowness of polycarbonate samples under daylight illumination identified as yellow index (Y.I.) is also reported correspdonging to the ASTM method D 1925-70. Yellowness index values were also determined on samples which were oven aged for 4 weeks in an air circulating oven at 140° C.

A resume of the reaction parameters and product properties are set out in Tables I and II.

the prior art and provides polycarbonates having the following advantages and characteristics:

(1) aromatic polycarbonates having a weight average molecular weight within the range of from about 25,000 to 65,000, preferably 35,000 to 65,000;
(2) a polydispersivity $\overline{M}w/\overline{M}n$ ratio within the range of from about 2.0 to 2.6 and;
(3) a monocarbonate content of about 150 to 400 parts per million derived as a by-product from the chain stopper.

The aromatic polycarbonates derived from this process, preferably, exhibit an intrinsic viscosity of at least 0.3, and more preferably about 0.5 deciliters per gram (dl.g) as measured in chloroform or a similar solvent system at 25° C. The upper intrinsic viscosity number is not critical, however, will benerally be about 0.8 dl/g. Expecially useful polycarbonates generally have intrinsic viscosities within the range of from about 0.38 to about 0.8 dl./g. Preferably, the polycarbonates have a number average molecular weight of at least about 5000, and more preferably from about 10,000 to about 35,000. Polycarbonates of such molecular weight characteristics process easily in between abòut 450° F. and 650° F., and are generally suitable raw materials for the manufacture of filaments, fibers, films, sheets, laminates, and other thermoplastic articles of manufacture including reinforced articles employing conventional molding, extruding, etc., manufacturing techniques.

We claim:

1. An improved interfacial polycondensation polycarbonate process wherein at least one non-sterically hindered dihydric phenol is reacted with a carbonyl halide in the presence of a polycondensation catalyst, the improvement comprising carrying out the process in accordance with the following process sequence
   (1) forming an equilibrated substantially uniform agitated two-phase admixture comprising:
      (i) an organic phase containing a non-sterically-hindered aromatic dihydroxy compound, an inert solvent, a polycondensation catalyst, and a chain-stopper,
      (ii) an aqueous phase containing a strong base and having a pH within the range of from 11 to 13,
   (2) adding to said admixture and reacting a carbonyl halide with the non-sterically-hindered aromatic dihydroxy compound at:
      (a) a pH range of 11 to 13,
      (b) an initial reaction temperature range of from 15° to 40° C.,

TABLE I

| | | REACTION PARAMETERS | | | | | | | |
|---|---|---|---|---|---|---|---|---|---|
| Run | Dihydric | Catalyst | | $COCl_2$ | Chain Stopper | | $H_2O$ | $CH_2Cl_2$ | pH | |
| No. | Phenol (g) | Type | (Mol %) | Mol % | Type | (Mol %) | ml. | ml. | Initial | Range |
| 1 | BPA (2280) | TEA | (1) | 128–141 | Phenol | (3.5) | 4300 | 6000 | 11.3 | 11.3–11.7 |

TABLE II

| | | | POLYMER PROPERTIES | | | | | | | | |
|---|---|---|---|---|---|---|---|---|---|---|---|
| Run | DPC | | GPC Data | | | | Unstab. | Stabilized | Unstab. | Stabilized | 4-Week |
| No. | ppm | I.V. | $\overline{M}w$ | $\overline{M}n$ | $\overline{M}w/\overline{M}n$ | Melt Index(M.I.) | % Chg. M.I. | % Chg. M.I. | Y.I. | Y.I. | Y.I. |
| 1 | 350 | 0.52 | 45,700 | 18,063 | 2.53 | 3840 | 2.5% | 2.3% | 5.6 | 4.6 | 7.8 |

In general, the use of the pre-phosgenation high pH equilibration process sequence of this invention provides advantages not described or associated with otherwise similar interfacial polycondensation processes of (c) a carbonylhalide rate of addition of 0.03 to 0.3 moles per minute per mole of aromatic dihydroxy compound, and (d) a chain-stopper content of 0.02 to 0.05 moles per mole of aromatic dihydroxy compound, to form a non-sterically-hindered aromatic polycarbonate having an $\overline{\text{Mw}}$ within the range of from 25,000 to 65,000 as determined by gel permeation chromotography and a monocarbonate by-product content of less than about 400 parts per million, and (3) recovering a non-sterically-hindered aromatic polycarbonate.

2. The claim 1 process wherein the non-sterically-hindered aromatic dihydroxy compound has the formula:

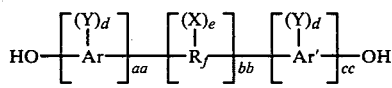

where $R_f$ is an alkylene, alkylidene, cycloalkylene, cycloalkylidene or arylene linkage or a mixture thereof, a linkage selected from the group consisting of ether, carbonyl, amine, a sulfur or phosphorous containing linkage, Ar and Ar' are arene radicals, Y is bromine, chlorine or a monovalent alkyl or alkoxy group, each d represents a whole number up to a maximum equivalent to the number of replaceable hydrogens substituted on the aromatic rings comprising Ar or Ar' subject to the proviso that when d is equal to two or more, no more than one Y group is ortho-positioned relative to an —OH group, X is bromine, chlorine or a monovalent hydrocarbon group selected from the class consisting of alkyl, aryl, cycloalkyl, and mixtures thereof, e represents a whole number of from 0 to a maximum controlled by the number of replaceable hydrogens on $R_f$, aa, bb and cc represent whole numbers including 0, when bb is not zero, neither aa or cc are zero, otherwise either aa or cc but not both are 0, when bb is zero, the aromatic groups are 0, when bb is zero, the aromatic groups are joined by a direct carbon bond.

3. The claim 2 process wherein the non-sterically-hindered dihydric phenol is of the formula:

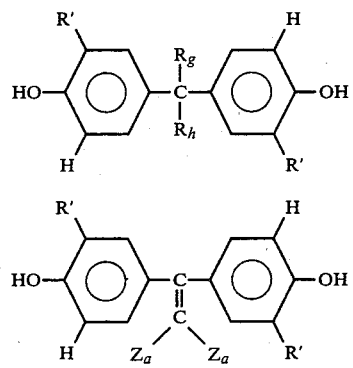

where independently each R' is hydrogen, bromine, chlorine or a $C_{1-4}$ alkyl or alkoxy group, $R_g$ and $R_h$ are hydrogen or a $C_{1-2}$ alkyl group, each $Z_a$ is hydrogen, chlorine or bromine, subject to the proviso that at least one $Z_a$ is chlorine or bromine.

4. The claim 3 process wherein the non-sterically-hindered aromatic dihydroxy compound is present as a major portion relative to a minor portion of a sterically-hindered aromatic dihydroxy compound.

5. The claim 4 process wherein the non-sterically-hindered aromatic dihydroxy compound portion is at least 90 mol percent.

6. The claim 5 process wherein the non-sterically-hindered dihydroxy compound is bis(4-hydroxyphenyl)-propane-2,2 and the base is an alkali metal hydroxide.

7. The claim 6 process wherein the bis(4-hydroxyphenyl)propane-2,2 portion is 100 mol percent, the inert solvent is methylene chloride, the chain stopper is phenol, the alkali metal hydroxide is sodium hydroxide, the aqueous phase pH is within the range of from 11.3 to 12.5, and the aromatic polycarbonate has an $\overline{\text{Mw}}$ within the range of from 35,000 to 65,000, as determined by gel permeation chromatography an $\overline{\text{Mw}}/\overline{\text{Mn}}$ ratio within the range of from about 2.2 to 2.6, and a diphenylcarbonate content within the range of 150 to 400 parts per million.

8. The claim 7 process wherein the pH range is from about 11.3 to 11.7.

9. The claim 7 process wherein the catalyst is an aliphatic tertiary amine.

10. The claim 9 process wherein the catalyst is triethylamine.

11. The claim 7 process wherein the catalyst is a quaternary phosphonium amine halide having the formula:

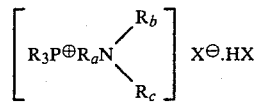

wherein independently each R is an alkyl, cycloalkyl or aryl group, $R_a$ is a divalent alkylene or cycloalkylene group, X is a halogen, and independently each $R_b$ and $R_c$ is an alkyl or cycloalkyl group.

12. The claim 11 process wherein R is a $C_{1-10}$ alkyl, $C_{4-10}$ cycloalkyl, or $C_{6-10}$ aryl group, $R_a$ is a $C_{3-12}$ alkylene or $C_{4-12}$ cycloalkylene group, $R_b$ is a $C_{1-10}$ alkyl or $C_{4-10}$ cycloalkyl group, and $R_c$ is a $C_{1-10}$ alkyl or $C_{4-10}$ cycloalkyl group.

13. The process of claim 1 wherein the organic phase contains a sterically-hindered aromatic dihydroxy compound.

14. The process of claim 1 wherein sterically-hindered aromatic dihydroxy compound is added to said admixture.

* * * * *